Figure 4:
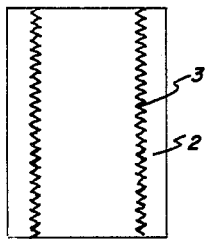

Sept. 14, 1965 H. M. BRENNECKE 3,205,574
EXPLOSIVE BONDING
Filed Nov. 1, 1962 2 Sheets-Sheet 1
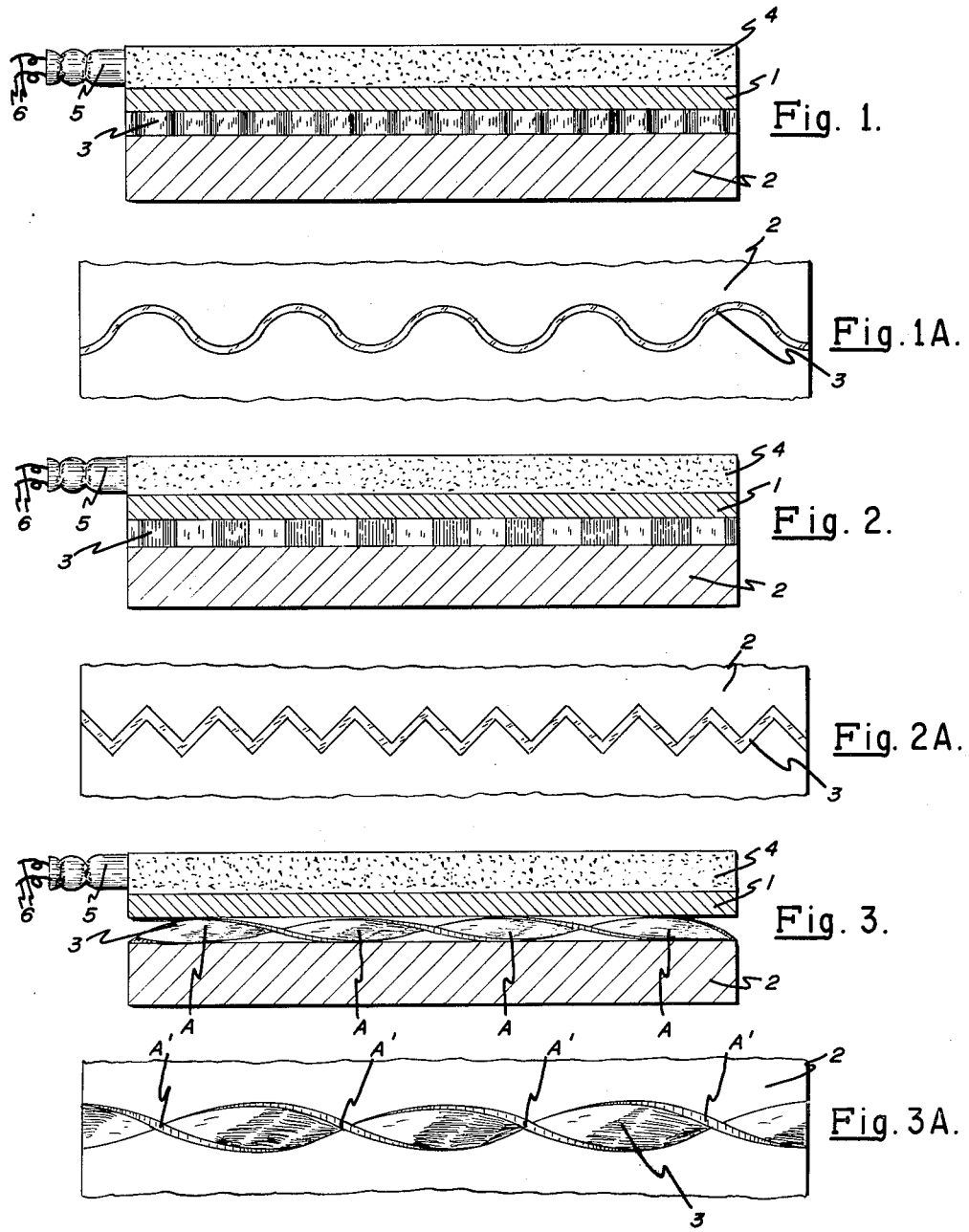
INVENTOR.
HENRY M. BRENNECKE
BY Sept. 14, 1965 H. M. BRENNECKE 3,205,574
EXPLOSIVE BONDING
Filed Nov. 1, 1962 2 Sheets-Sheet 2

INVENTOR.
HENRY M. BRENNECKE
BY John H. Tregoning

United States Patent Office 3,205,574
Patented Sept. 14, 1965

3,205,574
EXPLOSIVE BONDING
Henry M. Brennecke, Woodstown, N.J., assignor to E. I. du Pont de Nemours and Company, Wilmington, Del., a corporation of Delaware
Filed Nov. 1, 1962, Ser. No. 234,762
7 Claims. (Cl. 29—494)

The present invention relates to an improved method of bonding metals by explosive means.

A process has been described recently for bonding metal layers to form a mutlilayered body by supporting a metal cladding layer a distance of at least 0.001 inch from a metal base layer, placing a layer of an explosive having a detonation velocity less than 120% of the sonic velocity of the metal in the system with the highest sonic velocity on the outside surface of the metal cladding layer, and initiating the explosive so that detonation is propagated parallel to the metal layers.

To obtain continuous, uniform bonding by this process it is essential to provide a convenient and economical means of supporting the metal cladding layer at the requisite spacing from the base layer over the entire area of the two layers which supporting means does not interfere with the production of a strong, continuous metal-to-metal bond between the cladding and base layers. Metal powder particles of diameter equal to the desired separation or standoff have been used to support the cladding layer. However, metal powder particles are unsatisfactory in many respects. If a sufficient number of particles to provide adequate support for the metal cladding layer is used, the solid particles introduce a considerable mass of foreign material into the bonding zone. The deleterious effect of foreign material on the quality of the bond between the metal layers is particularly pronounced when the powder comprises a metal which is not metallurgically compatible with the metal layers, e.g., when the powder comprises a metal which reacts with the cladding and/or base layer to form a considerable quantity of a brittle intermetallic compound. The problems associated with introduction of foreign material into the bonding zone are compounded since the considerable number of finer particles associated with powder of a nominal particle size introduces additional mass into the bonding zone while contributing nothing to the support of the cladding layer. Furthemore, regardless of the composition and particle size distribution of the powder it is difficult to obtain uniform distribution of the powder on the base layer and it is virtually impossible to maintain the powder particles in position during the handling of the assembled components which usually precedes initiation of the explosive. When the powder particles shift from position, the cladding layer is unevenly supported and the bond formed between the cladding and base layers is nonuniform and, often, discontinuous.

Small projections or protrusions in the surface to be bonded of the cladding or base layer have been used to provide the required spacing between the layers. However the process of punching or pressing projections in one of the metal layers involves attenuation of the metal layer at those points at which projections are provided. These attenuated zones, a great number of which are required to provide sufficient support for most metal layers, often are visible as surface defects in the composite system and can have a deleterious effect upon, for example, the corrosion resistance of the composite system. Furthermore the process of punching or pressing projections in one of the metal layers becomes increasingly difficult as the thickness of the metal layer increases making such an operation infeasible when the metal layer is more than a few mils thick. Provision of projections by, for example, weld deposition, involves the same difficulties as are encountered with metal powder particles with respect to the inclusion of foreign material in the bonding zone and entrapment of air around solid supporting means.

Other means of supporting the metal cladding layer have attendant disadvantages. Small metal cups welded onto the cladding or base layer introduce less mass between the layers than do metal powders. However the number of cups which must be used to support a given cladding layer is relatively high. Furthermore such cups are expensive and hinder the egress of air from between the layers during the cladding process. This air entrapment results in unbonded zones and other serious difficulties such as the formation of blisters upon heating the clad metal system. Solid metal wires and rods in various arrangements have the double disadvantage of introducing large masses into the bonding zone and causing air entrapment.

Attempts to support the metal cladding at points removed from the interface between the cladding and base layers are only partially successful. Supporting means such as metal rods arranged substantially perpendicular to the metal layers and welded, for example, to various points on the edges of the cladding layer and to corresponding points on the adjacent edges of the base layer are unsatisfactory for systems in which the cladding layer is wide or heavy enough to bow under its own weight or under the weight of, for example, sand confinement. Additional supports suspended above the center of the cladding layer make the entire assembly cumbersome and difficult to handle.

I have found that the foregoing difficulties are overcome and a completely bonded clad metal system is conveniently produced by the process which comprises:

(a) Positioning a plurality of elongated metal ribbons on the surface to be bonded of a metal base layer, each of said ribbons having a width of at least 0.01 inch, a thickness substantially less than its width, being so deformed that each of the longitudinal edges thereof varies from a straight line in the plane of the metal base layer by at least 0.01 inch and being so disposed that the width thereof is perpendicular to the plane of the metal base layer at a plurality of points, (b) Supporting a metal cladding layer on said ribbons, said metal cladding layer being disposed substantially parallel to, and contiguous with, said base layer, (c) Covering the exposed surface of said cladding layer with a layer of detonating explosive having a detonation velocity between about 1200 meters per second and about 100 percent of the sonic velocity of the metal having the highest sonic velocity, and (d) Initiating said explosive so that detonation is propagated essentially parallel to the plane of the metal cladding layer.

Figure 5:
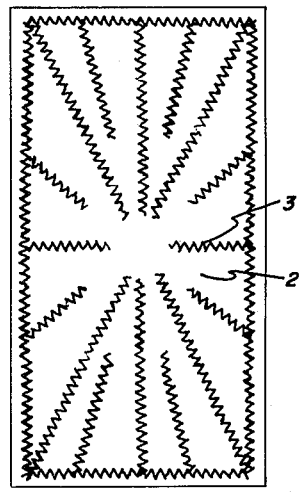
Figure 6:
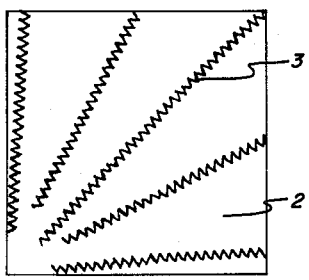

For a more complete understanding of the process of the present invention, reference is now made to the attached drawings in which like numbers indicate similar elements and in which FIGURES 1, 2, and 3 illustrate cross-sections of assemblies which may be used for the practice of the present invention, FIGURES 1A, 2A, and 3A are enlarged top view of portions of assemblies similar to those of FIGURES 1, 2, and 3, respectively, and FIGURES 4, 5, and 6 represent top views of portions of three different assemblies which may be used for the practice of the present invention.

In FIGURE 1, metal cladding layer 1 is supported above metal base layer 2 by means of elongated spacing members 3. The upper surface of metal cladding layer 1 is covered with a layer of a detonating explosive 4 to which is attached an electric blasting cap 5 having lead wires 6 to a source of electric current. In FIGURE 1A, which is an enlarged top view looking down on metal base layer 2, spacing member 3 which comprises a thin metal ribbon deformed into a regular sine wave configuration is standing "on edge" on metal base layer 2.

FIGURE 2 is distinguished from FIGURE 1 in that the elongated spacing member 3 comprises a thin metal ribbon deformed into a regular angular zigzag configuration standing "on edge" on metal base layer 2. FIGURE 2A is an enlarged top view looking down on the metal base layer 2 and elongated spacing member 3 depicted in FIGURE 2.

FIGURE 3 is distinguished from FIGURE 1 in that the elongated spacing member 3 comprises a thin metal ribbon twisted along its longitudinal axis so that the width of the ribbon is perpendicular to the plane of metal base layer 2 at points A in FIGURE 3 and A' in FIGURE 3A which is an enlarged top view looking down on the metal base layer 2 and elongated spacing member 3 depicted in FIGURE 3.

In FIGURES 4, 5, and 6 elongated spacing members 3 are positioned on metal base layers 2.

By the process of the present invention a uniform, continuous, metallurgical bond between the cladding and base layers is obtained. Metal ribbons as described above, having relatively small mass as compared with prior art supporting means, exhibit surprising strength and rigidity and provide sufficient support for a relatively heavy load, i.e., cladding layer, explosive, etc., without introducing excess foreign material into the bonding zone. It is very simple to provide uniform support for the cladding layer by means of relatively few ribbons thus eliminating the necessity for handling a large number of spacing members. Since the metal ribbons can easily be secured to the base layer, as will be more fully described hereinafter, the assembled components can be handled without shifting the ribbons from the position desired for provision of the required spacing between the cladding and base layers over the entire area of the layers. Finally, the composite system produced by the process of the present invention has no surface defects due to, for example, attenuation of the cladding layer or entrapment of air around the metal ribbons.

The specific composition and dimensions of the metal cladding and base layers, and the composition, loading and confinement of the explosive layer, are not critical provided these conditions are controlled so that the detonation velocity of the explosive layer is within the limits defined herein. By "metal" in the present application we mean any elemental metal or mixture of metals, e.g., an alloy.

The minimum separation or standoff between the metal layers which results in a strong, continuous metallurgical bond between metal layers is about 0.010 inch. The optimum size of this standoff depends upon a number of factors including the metal cladding layer thickness and density and the explosive loading, confinement, and detonation velocity. As is obvious to one skilled in the art, all of these factors are considered in selecting the metal ribbon having the optimum composition, dimensions, strength, and configuration to provide adequate support for the metal cladding layer without interfering in effective bonding or causing air entrapment or other deleterious effects in the clad metal system. Within the limits given above these factors also determine the proper number and arrangement of the elongated spacing members.

In general it is desirable to provide spacing members comprising essentially the metal of either the cladding or base layer and this represents a preferred embodiment of the present invention. However, ribbons of any metal which is metallurgically compatible with the cladding and base layers can be used. Use of spacing members which are metallurgically incompatible with the system may cause formation of brittle intermetallic compounds or of carbide precipitates and make subsequent treatment and working of the clad metal system tedious.

In all cases the width of the metal ribbon is at least 0.010 inch and is equal to the desired separation between the metal layers. Ribbon less than 0.010 inch wide is so difficult to manipulate and, in particular, to arrange so that its width is perpendicular to the base layer at a plurality of points, that the convenience and ease of application which are characteristic advantages of the process of the present invention are, for all practical purposes, lost. The spacing member provides maximum support to the cladding layer at those points at which the width of the ribbon is perpendicular to the plane of the base plate, or in other words, at those points at which the ribbon is "on edge" on the metal base layer. When the ribbon is deformed into a sine wave configuration as in FIGURE 1 or into an angular zigzag configuration as in FIGURE 2 the ribbon is "on edge" over its entire length. When the ribbon is twisted along its longitudinal axis as in FIGURE 3 these points of maximum support are, for example, at A, A', etc. As is apparent in the drawings, the overall width of a spacing member comprising a ribbon twisted as in FIGURE 3 is equal to the overall height of the spacing member.

The thickness of the ribbon is always considerably smaller than its width since as the thickness of the ribbon approaches the size of the width of the ribbon, the ribbon approaches the configuration of a solid wire or rod thus introducing the difficulties attendant upon inclusion of large masses of foreign material in the bonding zone and causing entrapment of air as described above. Obviously the thickness of the ribbon is kept to the minimum considering the strength of the ribbon and the load it supports. The weight of the explosive layer and confinement as well as the weight of the metal cladding layer must be considered in calculating this load.

Since the width of a spacing member comprising a ribbon twisted as in FIGURE 3 cannot be varied, the initial length of the ribbon is determined by the number of twists or points of maximum support per linear unit necessary to support a given load. The number of twists which can be provided per linear unit increases with the ductility of the metal ribbon and care must be taken to avoid straining the ribbon to the point at which it breaks under the load of the metal cladding layer, explosive, and confinement. The initial length of ribbons deformed as in FIGURES 1 and 2 depends upon the amplitude of the desired configuration or the overall width of the spacing member and, again, upon the number of "cycles" or deformations per linear unit. The average amplitude of the configuration is always at least 0.005 inch, i.e., the overall width of spacing members as in FIGURES 1 and 2 is at least 0.01 inch. A number of spacing members of different lengths are often used in the process of the present invention.

The number of spacing members used to support a given load depends upon the strength and dimensions of the individual members, the configuration and modulus of elasticity of the metal cladding layer and the method and location of initiation of the explosive layer. If the amplitude of the individual spacing members is relatively large and each member carries a relatively heavy load, only a few spacing members are necessary. Obviously, the number and/or length of the spacing members increases with the area of the cladding layer. A metal cladding layer with low elastic modulus requires a large number of spacing members to overcome the effect of bowing under its own weight and the weight of the explosive layer and confining medium. The bowing between rigidly supported points is particularly pronounced, for example, along the edges of the cladding layer and spacing members at close intervals or otherwise arranged to provide extra support are often desirable along these edges.

As stated above, the explosive layer must be initiated so that detonation is propagated parallel to the metal cladding layer. Effective bonding will not be obtained if the cladding layer is propelled in gross against the base layer by travelling in a direction generally normal to the surface of the base layer. Appropriate means of initiation are, for example, an electric blasting cap or detonating cord attached to the center, to a corner or to the center of an edge of the explosive layer, several caps, a cord, or a line-wave generator arranged along an edge of the layer, etc.

The spacing members generally are arranged essentially parallel to the direction of propagation of detonation. As is exemplified hereinafter this arrangement insures egress of air from between the metal layers and prevents the formation of blisters caused by the expansion of entrapped air during subsequent heating of the clad metal system. However, I have found that spacing members placed along the edges of the base layer at an angle to the direction of propagation of detonation do not interfere with this egress of air and they provide the additional support at the edges which, as was mentioned above, is often necessary. Furthermore, the space between the metal cladding and base layers can be evacuated prior to detonation thus precluding entrapment of air between the layers during the practice of the process of the present invention and obviating the need for care in arranging the metal ribbon in a particular manner with respect to the direction of propagation of detonation. In all cases the spacing members should be removed at least one or two inches from the point(s) of initiation and they can be spot welded or glued in place on the base layer for ease in handling.

The explosive cladding process as described above using spacing members of the configurations shown in FIGURES 1 to 3 represent preferred embodiments of the present invention. Using a ribbon of a given composition, width, thickness, and condition, the configuration of FIGURE 1 provides the strongest spacing member, the configuration of FIGURE 2 is readily provided in relatively short sections, and the configuration of FIGURE 3 requires a relatively short length of ribbon for a spacing member of a given length. All three configurations are easily prepared by, for example, hand twisting, crimping on gears, etc.

As is obvious to one skilled in the art metal spacing members of a number of different configurations may be used within the sense and scope of this invention. The amplitude and number of "cycles" per unit length may be constant or varied and a number of different types of spacing members may be used in conjunction with a single clad metal system.

The following examples illustrate specific embodiments of the process of the present invention. They are intended as illustrative only, however, and are not to be considered as exhaustive or limiting.

Examples 1 to 6 were carried out in the following manner.

The adjacent surfaces of a stainless steel plate 1/16 inch thick, 4 inches wide and 6 inches long and carbon steel plate 1/2 inch thick, 4 inches wide and 6 inches long were separated a distance of .015 inch by iron ribbons spot welded in various arrangements on the surface of the carbon steel plate. Each of these ribbons was .001 inch thick and .015 inch wide and was deformed into the configuration indicated. The outside surface of the stainless steel plate was covered with a layer of a grained amatol explosive comprising 50 parts ammonium nitrate and 50 parts trinitrotoluene. The layer of explosive, which was contained in a wooden frame 1/8 inch thick and 1 inch high placed on the perimeter of the stainless steel plate, was approximately 3/8 inch thick. The explosive had a weight distribution of 5.34 grams per square inch and a detonation velocity of about 3500 meters per second. A strip .050 inch thick, 1/4 inch wide, and 2 inches long of an explosive comprising a mixture of 70 parts very fine pentaerythritol tetranitrate and 30 parts of a 50/50 mixture of butyl rubber and a thermoplastic terpene resin and having a detonation velocity of about 7300 meters per second was attached to the wooden frame in the center of one of the edges of the layer of amatol explosive which was contiguous to one of the 4-inch edges of the stainless steel plate. An electric blasting cap having lead wires to a source of electric current was attached to the strip of high-detonation velocity explosive at a point outside the wooden frame and the layer of amatol explosive was covered with a sheet of waxed paper. The blasting cap was actuated by application of electric current and initiated, in turn, the strip of high-detonation velocity explosive and the layer of amatol explosive so that detonation was propagated from one 4-inch edge to the second 4-inch edge of the system or, in other words, so that the direction of propagation of detonation was parallel to the 6-inch edges of the system. After detonation of the explosive, each stainless steel-on-carbon steel system was studied by ultrasonic probing and metallographic examination. The composite system was stress-relieved by heating for 1/2 hour in air between 1000 and 1100° F.

*Example 1*

In this example an iron ribbon was positioned along the length of the carbon steel plate, parallel to and 1 inch in from each of the two 6-inch edges of the plate. Each of the ribbons was crimped into a sine wave configuration of 3 cycles per linear inch and approximately .050 inch amplitude and spot welded "on edge" on the surface of the carbon steel plate, i.e., so that the .015-inch dimension of the ribbon was perpendicular to the plane of the plate substantially as illustrated in FIGURE 4.

Detonation was propagated in a direction parallel to the length of the ribbons and after detonation, the stainless steel and carbon steel plates were found to be uniformly, metallurgically bonded over the entire area of the interface between the two plates. Even after heat treatment there was no evidence of blistering or of other bond defects in the clad metal system.

A second clad metal system was made using three ribbons of the configuration described above. A ribbon was spot welded across the width of the carbon steel plate, parallel to and 1 inch in from each 4-inch edge of the plate. The third ribbon was placed across the width of the plate, parallel to the first two and centered between them.

Detonation was propagated in a direction perpendicular to the length of the ribbons and after detonation of the explosive, there were unbonded zones of considerable area along the lines on which the ribbons had been placed. Upon heat treatment large blisters appeared on the surface of the stainless steel plate contiguous to the unbonded zones. Both the unbonded zones and the blisters were attributable to air entrapped around the metal ribbons during the cladding process.

*Example 2*

Arrangements were prepared identical to those described in Example 1, except that each of the ribbons was twisted along its longitudinal axis into a spiral configuration of three 180° turns per linear inch.

In the case in which detonation was propagated parallel to the length of the ribbons, after detonation the stainless steel-on-steel composite was found to be uniformly, metallurgically bonded over the entire area of the interface between the two plates in the case where the ribbons were parallel to the direction of detonation. There was no evidence of blistering or of the development of other bond defects during the stress-relieving heat treatment. On the other hand, in the case where the ribbons were perpendicular to the direction of propagation of detonation, unbonded zones of considerable area in the composite system were found along the lines on which the ribbons had been placed and during heat treatment large blisters developed on the surface of the stainless steel plate contiguous to the unbonded zones. As in Example 1, unbonded zones and blistering probably were due to air entrapped around the metal ribbons during the explosive cladding operation.

*Example 3*

In this example, an iron ribbon was spot welded along the length of the carbon steel plate, parallel to and 1 inch in from each 6-inch edge of the plate. Each of these ribbons was twisted along its longitudinal axis into a spiral configuration of one 180° turn per inch.

Detonation was propagated in a direction parallel to the length of the ribbons and after detonation of the explosive, the clad metal system was found to be uniformly, metallurgically bonded over the entire area of the interface between the stainless steel and carbon steel plates. Even after heat treatment there was no evidence of blistering or of other bond defects in the composite metal system.

*Example 4*

In this example, an iron ribbon was spot welded along the length of the carbon steel plate, parallel to and 1 inch from each 6-inch edge of the plate. Each of the ribbons was twisted along its longitudinal axis into a spiral configuration of ten 180° turns per linear inch and detonation was propagated in a direction parallel to the length of the ribbons.

A completely bonded clad metal system of the quality of the first clad metal system described in each of the preceding examples was produced.

*Example 5*

Two ribbons were arranged on the surface of the carbon steel plate as described in Example 4. Each ribbon was deformed into a sine wave configuration of 16 cycles per linear inch and approximately .040 inch amplitude and set "on edge" on the carbon steel plate, i.e., so that the .015-inch dimension of the ribbon was perpendicular to the plane of the plate.

Detonation was propagated in a direction parallel to the length of the ribbons and a completely bonded stainless steel-on-steel composite which did not blister during heat treatment was produced.

*Example 6*

A row of three ribbons, each of which was about 1 inch long, was spot welded along the length of the carbon steel plate, parallel to and 1 inch from each 6-inch edge of the plate. Each ribbon was crimped into an angular zigzag configuration of 20 cycles per inch and constant amplitude of about .020 inch. Each ribbon was set "on edge" on the carbon steel plate, i.e., so that the .015-inch dimension of the ribbon was perpendicular to the plane of the plate.

Detonation was propagated in a direction parallel to the length of the ribbons and a completely bonded stainless steel-on-steel clad metal system which did not blister during heat treatment was produced.

*Example 7*

A copper plate ¼ inch thick, 1 foot wide, and 2 feet long was supported above and parallel to a mild steel plate 1 inch thick, 1 foot wide, and 2 feet long. The adjacent surfaces of the two plates were separated a distance of .140 inch maintained by about 20 mild steel ribbons varying in length from about 3 inches to about 22 inches which were spot welded on the surface of the mild steel plate substantially as illustrated in FIGURE 5. Each of these ribbons was .002 inch thick and .140 inch wide, and was deformed into a sine wave configuration of 3 cycles per linear inch and approximately .050 inch amplitude. Each ribbon was placed "on edge" on the surface of the mild steel plate, i.e., so that the .140-inch dimension of the ribbon was perpendicular to the plane of the plate. The upper surface of the copper plate was covered with a layer of a grained amatol explosive comprising 80 parts ammonium nitrate and 20 parts trinitrotoluene. The layer of explosive which was contained in a wooden frame ⅛ inch thick and about 2 inches high placed on the perimeter of the copper plate, was 1¼ inches thick. The explosive had a weight distribution of 16.55 grams per square inch and a detonation velocity of about 4000 meters per second. One end of a cord .178 inch in diameter and 2 inches long of an explosive comprising 24 parts very fine pentaerythritol tetranitrate, 67 parts red lead, and the remainder, a mixture of polybutene, polyisobutylene, butyl rubber, an aromatic hydrocarbon resin plasticizer, and refined mineral oil and having a detonation velocity of about 4370 meters per second was secured in the center of the layer of amatol explosive. An electric blasting cap having lead wires to a source of electric current was attached to the free end of the explosive cord. The layer of amatol explosive was covered with waxed paper and the entire assembly was covered with a pile of sand 3 feet deep. The blasting cap was actuated by application of electric current and initiated, in turn, the explosive cord and the layer of amatol explosive. After detonation, which was propagated from the center toward the edges of the assembly or substantially parallel to the length of most of the ribbons, the copper and mild steel were found by ultrasonic probing and by metallographic examination to be uniformly, metallurgically bonded over substantially the entire area of the interface between the two plates.

*Example 8*

A copper-on-mild steel clad metal system of the composition, dimensions, and quality described in Example 7 was prepared by the technique of Example 7. However, in this example, before detonation the copper and mild steel plates were separated a distance of .120 inch maintained by copper ribbons .002 inch thick and .120 inch wide. The copper ribbons were of the configuration described in Example 7 and were arranged on the carbon steel plate substantially as described therein.

*Example 9*

A copper-on-mild steel composite 6 inches wide and 6 inches long was prepared using a modification of the technique of Example 7. Before detonation the adjacent surfaces of the ¼-inch thick copper plate and the 1-inch thick mild steel plate were separated a distance of .140 inch maintained by 20 shim steel ribbons .002 inch thick and .140 inch wide arranged on the mild steel plate substantially as illustrated in FIGURE 5. Each of the ribbons was twisted along its longitudinal axis into a spiral configuration of one 180° turn per linear inch. The upper surface of the copper plate was covered with a 1¼-inch layer of the amatol explosive of Example 7 contained in a wooden frame as described therein. Detonation of the layer of explosive, initiated as in Example 7, was carried out in air. After detonation, which was propagated in a direction substantially parallel to the length of most of the ribbons, ultrasonic probing and metallographic examination revealed that the copper and mild steel were uniformly, metallurgically bonded over the entire area of the interface between the plates. No blisters or other bond defects developed during heat treatment of the composite.

*Example 10*

A stainless steel plate ¹⁄₁₆ inch thick, 15 inches wide and 15 inches long was supported above and parallel to a mild steel plate ½-inch thick, 15 inches wide and 15 inches long. The adjacent surfaces of the two plates were separated a distance of .030 inch maintained by five iron ribbons spot welded on the surface of the mild steel plate substantially as illustrated in FIGURE 6. Each of these ribbons was .001 inch thick and .030 inch wide and was deformed into a sine wave configuration of 3 cycles per linear inch and approximately .050 inch amplitude. The upper surface of the stainless steel plate was covered with a ⅜-inch layer of the amatol explosive of Examples 1 to 6 contained in a wooden frame. A strip of a higher-detonation velocity explosive and an electric blasting cap were attached as described in Examples 1 to 6. However, in this example, the explosive strip and blasting cap were attached to that corner of the layer of explosive which was contiguous to the corner of the plate assembly at which the iron ribbons converged. Detonation of the layer of explosive was carried out in air. After detonation which was propagated in a direction substantially parallel to the length of the metal ribbons, it was found by ultrasonic probing and metallographic examination that the stainless steel and mild steel were uniformly, metallurgically bonded over the entire area of the interface between the plates. No blisters or other bond defects in the composite developed during heat treatment.

*Example 11*

A stainless steel-on-mild steel clad metal system of the composition, dimensions, and quality described in Example 10 was prepared by the technique of Example 10. The .030 inch separation between the adjacent surfaces of the plates was maintained by 5 iron ribbons arranged on the surface of the mild steel plate as illustrated in FIGURE 6. Each of the ribbons was .001 inch thick and .030 inch wide and was twisted along its longitudinal axis into a spiral configuration of one 180° turn per linear inch.

*Example 12*

A mild steel plate ¼-inch thick, 2 feet wide and 8 feet long was supported above and parallel to a mild steel plate 1 inch thick, 2 feet wide, and 8 feet long. The adjacent surfaces of the two plates were separated a distance of 0.105 inch maintained by 7 iron ribbons, 5 of which were laid along the length of the 1-inch thick plate at 6-inch intervals and spot welded in place and 2 of which were laid along the short edges of the plate and welded in place. Each of these ribbons was .003 inch thick and .105 inch wide and was deformed into a sine wave configuration of 10 cycles per linear inch and approximately .10-inch amplitude. The upper surface of the ¼-inch thick plate was covered with a 1¼-inch layer of an explosive comprising a 50/50 mixture of sodium chloride and the amatol explosive described in Example 7. The explosive was contained in a wooden frame and had a weight distribution of more than 6 pounds per square foot and a detonation velocity of about 2800 meters per second. A cord of a higher-detonation velocity explosive and an electric blasting cap were attached as described in Example 7. However, in this example the cord was secured in the layer of explosive at a point 1 foot from one of the short edges of the wooden frame and 1 foot from each of the long edges of the wooden frame. The edges of the metal plate assembly were sealed using a strip of 3-inch wide vinyl tape which was applied along the 4 sides comprising the periphery of the metal plate assembly. The space between the plates was evacuated to a pressure of 25 millimeters of mercury via a small copper tube inserted in a hole drilled in the ¼-inch thick plate. Detonation of the layer of explosive was carried out in air. After detonation which was propagated in a direction essentially perpendicular to most of the ribbons over substantial portions of the lengths of the ribbons it was found by ultrasonic probing and metallographic examination that the two mild steel plates were essentially uniformly, metallurgically bonded over the entire area of the interface between the plates.

The invention having been fully described in the foregoing I intend to be limited only by the following claims.

I claim:

1. In the process for explosively bonding metal layers which comprises supporting one metal layer substantially parallel to an adjacent metal layer and separated therefrom by a space, placing a layer of a detonating explosive adjacent the outer surface of one of said layers, said explosive having a detonation velocity of between about 1200 meters per second and 100% of the sonic velocity of the metal in the system having the highest sonic velocity, and initiating the explosive so that a detonation is propagated substantially parallel to said layers, the improvement which comprises supporting said layers in spaced apart relationship by a plurality of elongated thin metal ribbons metallurgically compatible with said layers, having a width of at least 0.01 inch and a thickness substantially less than their width, the longitudinal edges of each thereof varying from a straight line in the plane of the said metal layers by at least 0.01 inch and the width thereof being perpendicular to the plane of the layers at a plurality of points.

2. A process of claim 1 wherein said ribbons are of substantially the same metal as one of said layers.

3. A process of claim 1 wherein said metal ribbons have a regular sine-wave configuration, the width thereof is perpendicular to said layers and the longitudinal edges thereof are each in contact with one of said layers along substantially the entire length of said edges.

4. A process of claim 1 wherein said metal ribbons have a regular, angular zigzag configuration, the width thereof is perpendicular to said layers and the longitudinal edges thereof are each in contact with one of said layers along substantially the entire length of said edges.

5. A process of claim 1 wherein each of said ribbons is twisted along its longitudinal axis, the width thereof being perpendicular to the plane of said layers at a plurality of spaced points where the longitudinal edges thereof are in contact with said layers.

6. A process of claim 1 wherein said ribbons are substantially parallel to the direction of propagation of said detonation.

7. A process of claim 1 wherein said space between said layers is evacuated prior to detonation of said explosive.

References Cited by the Examiner

UNITED STATES PATENTS

| | | |
|---|---|---|
| 3,031,746 | 5/62 | Ciarleglio et al. ____ 29—497.5 X |
| 3,055,095 | 9/62 | Barry. |
| 3,121,283 | 2/64 | Kaempen. |
| 3,137,937 | 6/64 | Cowan et al. _____ 29—486 |

JOHN F. CAMPBELL, *Primary Examiner.*